United States Patent [19]

Hazan

[11] Patent Number: 5,501,034
[45] Date of Patent: Mar. 26, 1996

[54] DEVICE FOR DESTROYING INSECTS

[76] Inventor: Haim Hazan, 312/12 Zvi Borenstein Street, Yerucham, Israel

[21] Appl. No.: 345,762

[22] Filed: Nov. 22, 1994

[30] Foreign Application Priority Data

Nov. 23, 1993 [IL] Israel .................................. 107721

[51] Int. Cl.⁶ ........................................................ A01M 1/20
[52] U.S. Cl. .................................. 43/132.1; 43/138
[58] Field of Search .................................. 43/132.1, 135, 43/138, 113, 137, 142

[56] References Cited

U.S. PATENT DOCUMENTS

| | | | |
|---|---|---|---|
| 2,737,753 | 3/1956 | Bittner | 43/132.1 |
| 3,123,933 | 3/1964 | Roche | 43/113 |
| 3,987,578 | 10/1976 | Rueff | 43/113 |
| 4,251,945 | 2/1981 | Tasma | 43/113 |
| 4,356,656 | 11/1982 | Tasma | 43/113 |
| 4,438,585 | 3/1984 | Slatton | 43/113 |
| 4,519,160 | 5/1985 | McBrayer | 43/113 |
| 4,819,370 | 4/1989 | Woodruff | 43/113 |
| 4,856,226 | 8/1989 | Taylor | 43/113 |
| 5,003,721 | 4/1991 | Underwood | 43/132.1 |
| 5,014,460 | 5/1991 | Patti | 43/113 |

Primary Examiner—Kurt Rowan
Attorney, Agent, or Firm—Shoemaker and Mattare, Ltd.

[57] ABSTRACT

A device for destroying insects by mechanical impact comprises a housing provided with a base member; a curved wall; a first segment of the base member being at least partially open and exposed to an area from which flies and other insects are to be attracted, and an aperture provided in the housing through which impacted insects are removed therefrom; a lure for attracting insects associated with the first segment of the base member and a leaf spring having a first extremity which is attached near the centre of curvature of the curved wall, the spring being substantially straight at its second extremity, the second spring extremity being close to the inner surface of the curved wall. The device also includes means for bend-loading the leaf spring and for suddenly releasing the second extremity, thereby causing the leaf spring to traverse the first segment at high velocity and to impact any insects present within the housing segment.

13 Claims, 4 Drawing Sheets

DEVICE FOR DESTROYING INSECTS

The present invention relates to a device for destroying insects such as flies and cockroaches.

More particularly, the invention provides a power-operated device for killing insects by attracting them into a housing and then impacting said insects by contact with a suddenly-released leaf spring, which device is usable in homes, gardens, and other enclosed or open areas, as well as in barns or chicken coops where insects are known to congregate.

Insects, besides being a nuisance to both humans and animals, are a well-recognized health hazard, and should be kept away from areas where food is prepared or consumed. Also, those insects which sting humans and animals often spread diseases thereby, thus providing sufficient reason for attempts to eliminate them apart from the natural aversion of people to being stung.

Many different types of devices have been developed to deter insects from entering an area, to trap them, or to kill those contacting the device. Each device has advantages and disadvantages. Many such devices can be dangerous to children and/or household pets, and must be kept out of their reach. Obviously, devices using high-voltage electricity must be well-protected from human or animal contact. Some devices spray or otherwise disperse insecticides into the air, which is then inhaled by people. Such air contamination is suspected of posing a health hazard; moreover, there is an absence of tests proving long-term exposure as harmless.

One consideration in the design of insect-combatting devices is whether the device is to be operated indoors or outdoors; many devices are suitable for only one of these uses. A further consideration is whether the device can operate without an electricity supply, and whether it requires frequent servicing or replacement.

A known device, which emits ultrasonic sound waves, is claimed to deter both rodents and some insects, such as mosquitoes. This device deters the approach of either type of pest, but does not kill them. It has the advantages of not posing any health hazard, as far as is presently known.

Israel Patent No. 50705 describes an insect-combatting device having a body provided with a porous surface, which releases naled insecticide over a prolonged period of time. Such a device may pose a health hazard if placed in residences.

Israel Patent No. 82848 describes a method of killing flies by means of lures, which also includes the use of an insecticide.

Israel Patent No. 94927 describes a device for destroying insects and pests through the use of multiple spikes and corresponding holes. Such a device may be effective only against larger pests, and would need regular servicing and cleaning.

A grid charged with high-voltage electricity is used in appliances manufactured in Israel by the Amcor Company. An ultra-violet light is used to attract flying pests to the grid, which then electrocutes those coming into contact therewith.

The Sano Company of Hod Hasharon markets a container of insecticide under the trade name Combat. The container is designed to allow insects to reach the insecticide by crawling along a curved passage therewithin, and access is practically impossible to children. However, the device requires frequent replacement.

In view of the above-described state of the art, the objectives of the present invention are to obviate the disadvantages of the prior art insect-combatting devices, and to provide a device which destroys insects without requiring the use of insecticides and which poses no serious danger to people or to animals.

Said objectives are achieved by providing a device for destroying insects by mechanical impact, comprising a housing provided with a base member, a curved wall, a first segment of said base member being at least partially open and exposed to an area from which flies and other insects are to be attracted, and an aperture provided in said housing through which impacted insects are removed therefrom; a lure for attracting insects associated with said first segment of said base member; a leaf spring having a first extremity which is attached near the centre of curvature of said curved wall, said spring being substantially straight at its second extremity, the second spring extremity being close to the inner surface of said curved wall; means for bend-loading said leaf spring and for suddenly releasing said second extremity, thereby causing said leaf spring to traverse said first segment at high velocity and to impact any insects present within said housing segment.

In a preferred embodiment of the invention, there is provided a device for destroying insects by mechanical impact, comprising a housing provided with a base member, a curved wall, a first segment of said base member being at least partially open and exposed to an area from which flies and other insects are to be attracted, and an aperture provided in said housing through which impacted insects are removed therefrom; a lure for attracting insects associated with said first segment of said base member; a leaf spring coiled at a first extremity which is attached to a revolvably driven shaft positioned near the centre of curvature of said curved wall, said spring being substantially straight at its second extremity, said second spring extremity being close to the inner surface of said curved wall; at least one stop means rigidly attached to the housing near said curved wall, configured to intermittently contact said spring adjacent to said second extremity so that continued drive of said shaft causes bending of said leaf spring and a consequent shortening of the distance between the two spring extremities, further drive of the shaft causing the second extremity to be suddenly released by the stop means, causing the leaf spring to traverse the first segment at high velocity, to impact any insects present within the housing; further movement of said spring causing the impacted insects to be driven to the aperture of the housing and to pass therethrough, and still further drive of the spring bringing it into renewed contact with the stop means.

In another preferred embodiment of the present invention, there is provided a device for destroying insects by mechanical impact, comprising a housing provided with a base member, a curved wall, a first segment of said base member being at least partially open and exposed to an area from which flies and other insects are to be attracted, and an aperture provided in said housing through which impacted insects are removed therefrom; a lure for attracting insects associated with said first segment of said base member; a leaf spring having a first extremity which is rigidly attached near the centre of curvature of said curved wall, said spring being substantially straight in its unloaded state, the second spring extremity being close to the inner surface of said curved wall; spaced-apart first and second electro-magnets positioned adjacent to said curved wall, said first magnet being opposite a first side of said spring for bend-loading said leaf spring towards said first electro-magnet, subsequent sudden release of said second extremity causing said leaf spring to traverse said first segment at high velocity, to impact any insects present within said housing segment, and by kinetic energy to then enter the magnetic field of said second electro-magnet for attachment thereto in bend-loaded condition; a control and timing device, electrically connected to said electro-magnets, for alternately charging and discharging said magnets, a time interval of at least 2 minutes occurring between charge changeover of said magnets.

Still further embodiments of the invention will be described hereinbelow.

It will be realized that the novel device of the present invention has safety advantages over many other devices. Furthermore, the safety of the device can be still further enhanced by mounting it on a wall, out of reach of children and animals.

A test was carried out to compare the effectiveness of the device of the present invention with that of a standard appliance using a high-voltage electricity grid and an ultra-violet lamp, and a conical trapping bottle with an insect attractant. The device made according to the present invention was provided with a line-powered, 2 rpm geared electric motor. The housing was disc-shaped and had an outer diameter of 40 cm; it was oriented horizontally and contained a food lure.

Results: The high-voltage appliance killed 62 insects in 4 hours. The conical trapping bottle caught 60 insects in 4 days. The device of the present invention killed 130 insects in 4 hours.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1A:
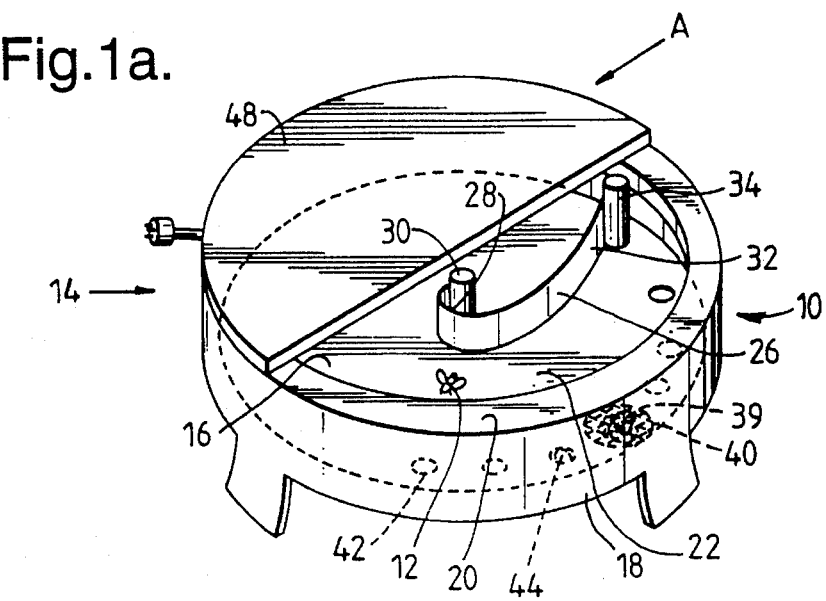
FIG. 1a is a perspective view of a preferred embodiment of the insect destruction device according to the invention, with its perforated shield removed.
Figure 1B:
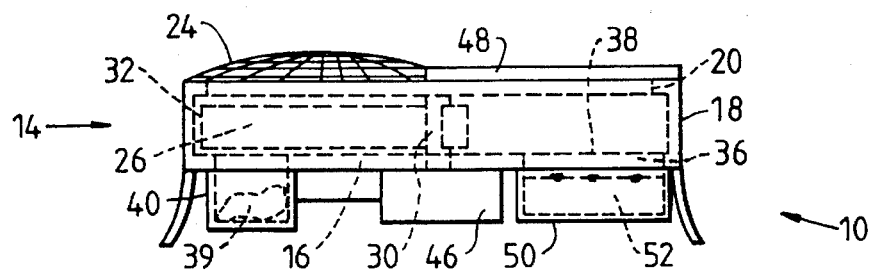
FIG. 1b is a side elevational view of the device of FIG. 1, taken in the direction of arrow A.

There is seen in FIGS. 1a and 1b a device 10 for destroying insects 12 by mechanical impact, comprising a housing 14 provided with a base member 16. Housing 14 is shown in a horizontal orientation, but it will be understood that the device can be equally well-adapted to vertical use, or to suspension from either a horizontal or a vertical surface. Housing 14 can be suitably made of a thermoplastic material such as, for example, polyurethane, advantageously in the form of a structural foam. At least a major portion of housing 14 is surrounded by a curved wall 18. The curved wall 18 is further provided with a retention lip 20, configured to improve retention of insects 12 inside the housing 10 during and after impact. A first segment 22 of base member 16 is at least partially open and exposed to the area from which flies and other insects are to be attracted.

Device 10 is provided with a perforated shield 24 (seen in FIG. 1b but removed from the other figures for purposes of clarity) which protects segment 22 to prevent the entry of a limb of a person or an animal.

Figure 2A:
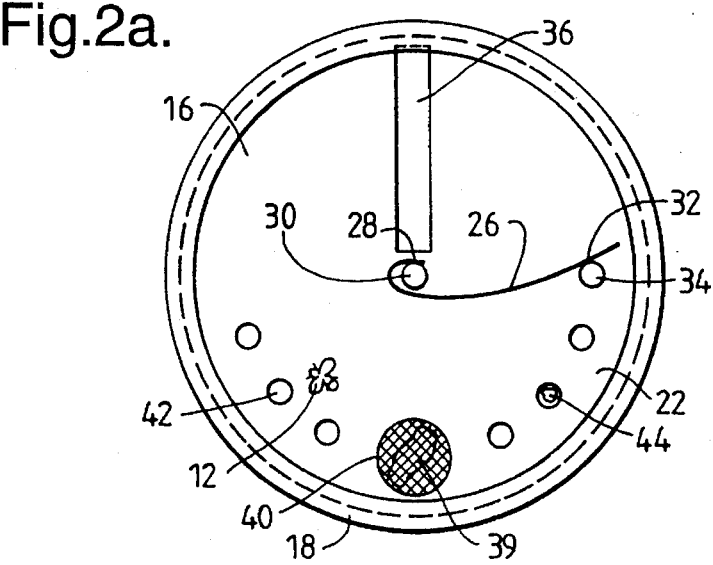
FIGS. 2a, 2b and 2c are plan views of the device of FIG. 1, after removal of cover 48, and show the leaf spring in three different stages of operation.
Figure 2B:
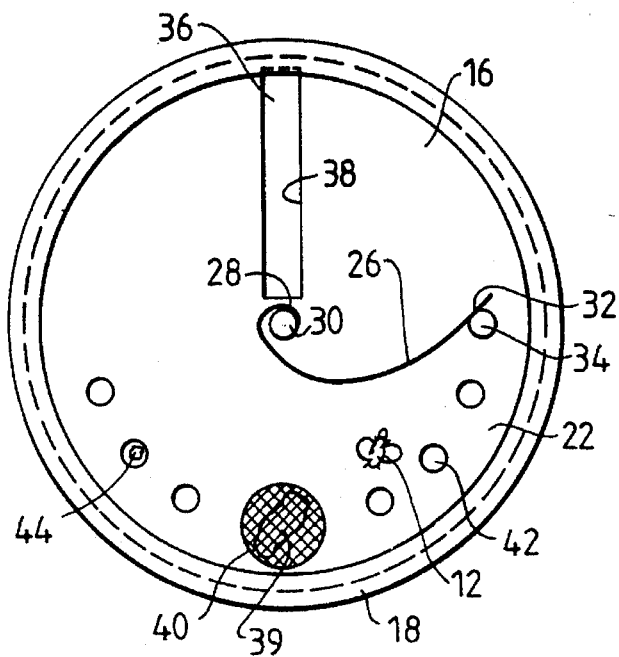
Figure 2C:
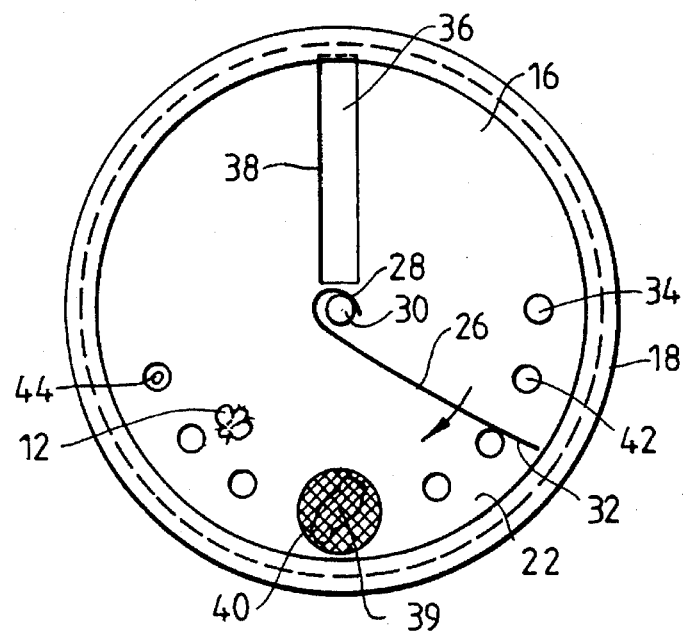

Referring now also to FIGS. 2a, 2b and 2c, a leaf spring 26 is coiled at a first extremity 28 which is attached to a revolvably-driven shaft 30, positioned near the centre of curvature of the curved wall 18. The spring 26, when in its released condition as in FIG. 2c, is substantially straight near its second extremity 32, which is close to the inner surface of curved wall 18. Stop means 34, shown in the form of a steel pin, are rigidly attached to the housing 14, positioned near the curved wall 18, and configured to intermittently contact spring 26 adjacent to its second extremity 32.

In operation, as clearly seen in FIG. 2b, drive of the shaft 30 causes bending of leaf spring 26 and a consequent shortening of the distance between the two spring extremities 28, 32. Further drive of the shaft 30, as seen in FIG. 2c, causes the second extremity 32 to be suddenly released by stop means 34, causing leaf spring 26 to traverse the first segment 22 at high velocity, impacting and killing, or at least disabling, any insects 12 in its path. It is to be noted that in the embodiment shown, curved wall 18 extends completely around the disk-shaped housing 14, and the shaft 30 is continuously driven at constant speed in the same direction. The second extremity 32 consequently follows a full circular path.

An aperture 36 is provided in housing 14 for the removal of impacted insects. Said removal is effected by further movement of spring 26, which drives the impacted insects to the entry port 38 of aperture 36, causing them to pass therethrough by centrifugal force and by gravity.

Yet further drive of the spring 26, as seen in FIG. 2a, brings the second spring extremity 32 into renewed contact with stop means 34 for repetition of the cycle. A cycle time of about 30 seconds has been found to be effective.

At least one lure 39 for attracting insects is associated with the first segment 22. A first lure 39 is shown in a container 40, which is at least partially exposed to the upper face of first segment 22. The lure 39 advantageously comprises materials emitting an odour attractive to insects.

The first segment 22 is shown provided with multiple recesses 42 on its upper face. Small pieces of food 44 may be placed in the recesses to attract insects 12, which are then impacted by leaf spring 26.

Referring now to FIG. 1b, the shaft 30 is preferably driven by a geared electric motor 46, which is shown attached to the lower face of base member 16.

In the preferred embodiment shown, a cover 48 is provided to extend over part of the area traversed by the leaf spring 26, thus enhancing safety.

Preferably a reservoir 50 of liquid 52 is arranged to receive impacted insects 12 after they pass through the aperture 36. This is particularly effective against insects which have been partially disabled by impact. It is to be noted that the liquid 52 may be water, and that there is no need to use an insecticide. This is because the surface tension of the water makes escape therefrom impossible for insects of moderate size.

Figure 3:
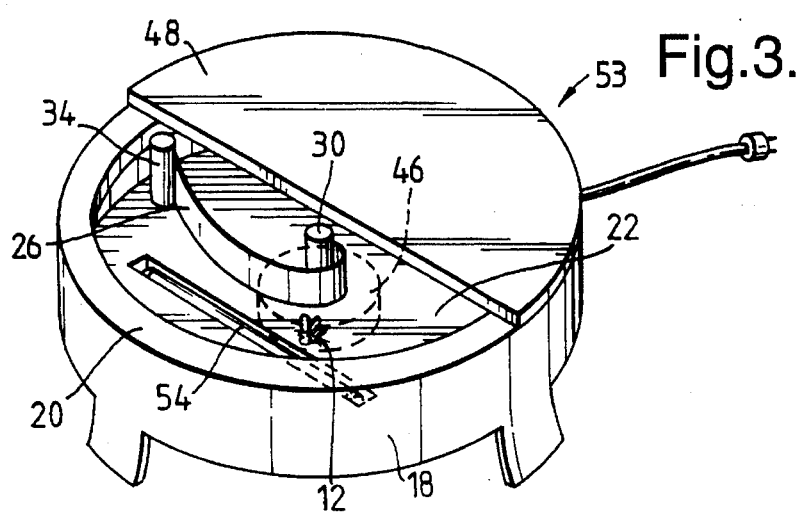
FIG. 3 is a perspective view of an embodiment of the invention which is provided with an ultra-violet lure.

FIG. 3 shows a device for destroying insects 53, similar to that shown in FIG. 1a, but provided with a lure comprising an ultra-violet light bulb 54. The entire body of the bulb 54 is positioned below the upper surface of first segment 22. Such a light bulb has a life expectancy of several thousand hours, and it therefore requires less servicing than a lure which produces an odour attractive to insects.

Device 53 is driven by an electric motor 46, and is suitable for use in locations where electric power is readily available.

Figure 4:
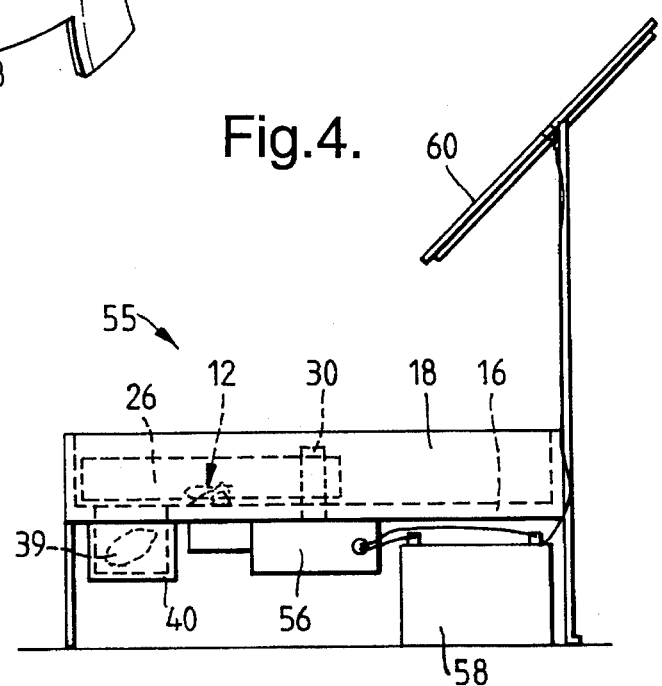
FIG. 4 is a side elevational view of an embodiment of the invention for outdoor use, and provided with a storage battery.

Referring now to FIG. 4, there is seen a device 55, similar to device 10 but driven by a D.C. motor 56 in the range of 2–4 W and powered by an electric storage battery 58. For example, a lead-acid rechargeable battery, of the type commonly used in automobiles, operating at 12 V and 300 mA, will drive the shaft 30 for 200 hours or more before requiring recharging.

Device 55 is intended for outdoor use. The battery may be recharged by use of a solar cell array 60. It is to be noted that, because of its intended use outdoors, there is no need to provide a retention lip 20, a perforated shield 24, or a cover 48, which items are described above with reference to FIGS. 1a and 1b.

Figure 5:
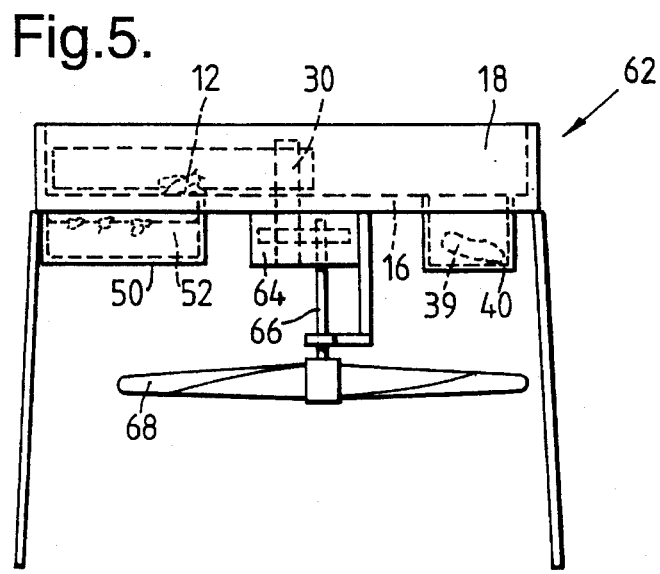
FIG. 5 is a side elevational view of a further embodiment of the invention for outdoor use, operated by a wind turbine.

FIG. 5 depicts a further, similar device 62 which is also intended for outdoor use and is of particular utility in locations where electric power is not readily available. Shaft 30 extends into a gear mechanism 64, which is powered by a wind turbine 66. Production of the required 2–4 W of mechanical power is possible with the use of a two-bladed propeller 68, which need be no larger than 20 to 30 cm in diameter.

Figure 6:
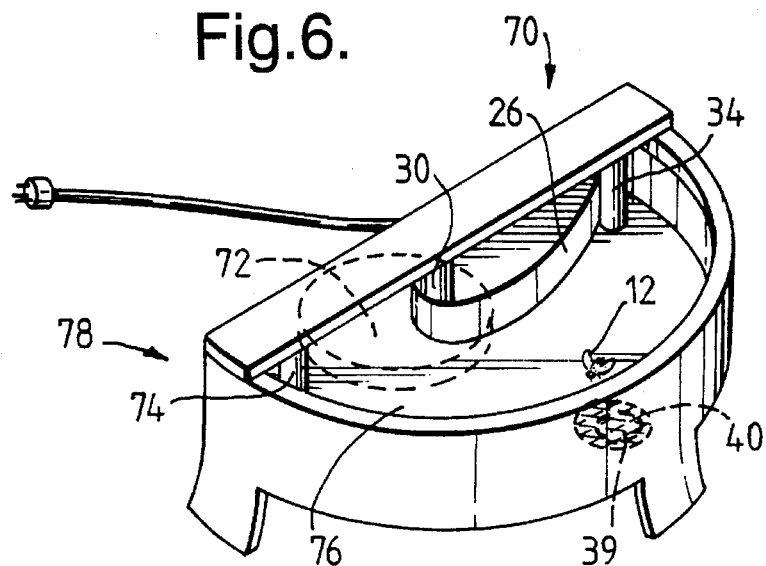
FIG. 6 is a perspective view of a compact embodiment of the invention for use indoors.

There is seen in FIG. 6 an embodiment 70 of a device for destroying insects, wherein the leaf spring 26 is connected to drive means 72, arranged to alternate between backward and forward drive. Such drive means are commonly found on oscillating fans and on automobile windscreen wipers. Spring 26 is thus driven in one direction for a partial revolution, for example, 150 to 210 degrees, to contact and pass a first stop means 34, and is then driven in the reverse direction, to contact and pass second stop means 74. An advantage of this arrangement is improved utilization of the area of the base member 76, resulting in a housing 78 which is only about 60 percent of the size of housing 14 described above with reference to FIG. 1. The embodiment 70 is thus well-suited for indoor use.

Figure 7:
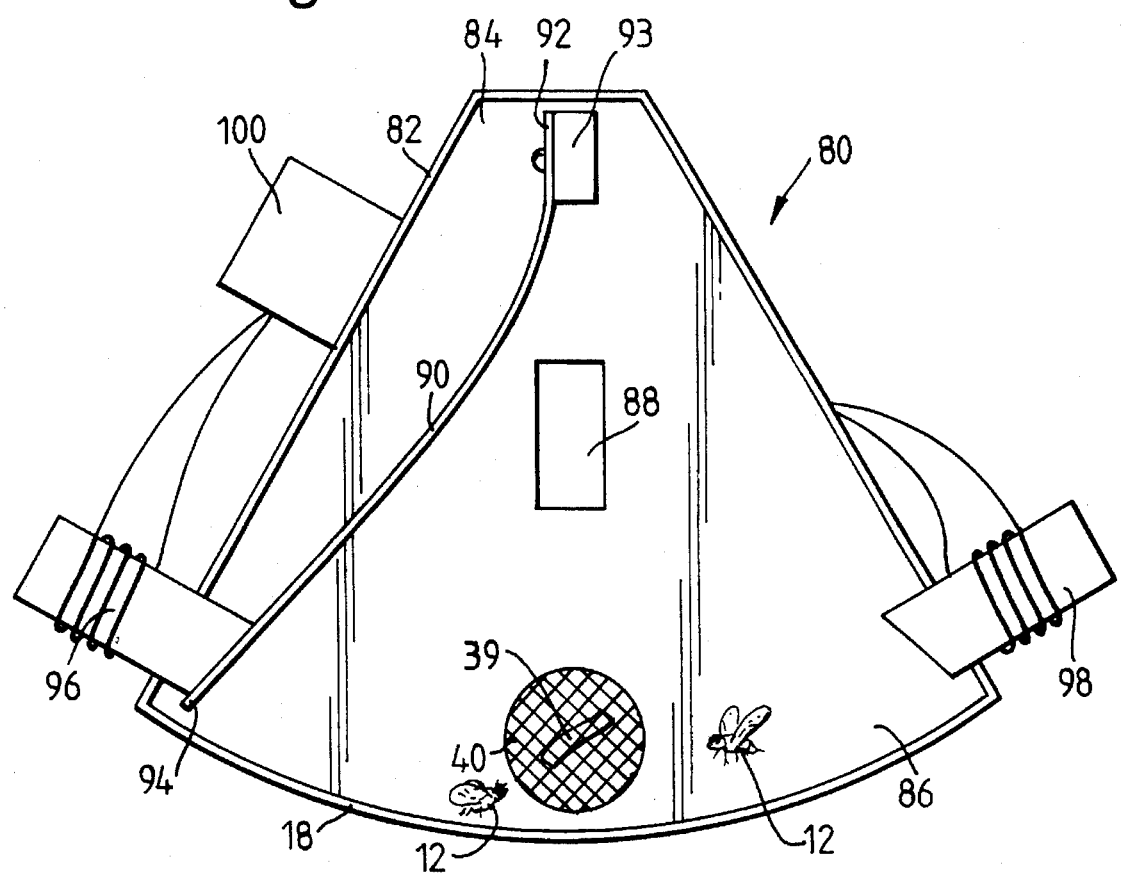
FIG. 7 is a plan view of an embodiment using electromagnets to drive the leaf spring.

FIG. 7 shows a further embodiment 80 of the device for destroying insects by mechanical impact. A housing 82 is provided with a base member 84, and a curved wall 18. A segment 86 of the base member 84 is open and exposed to an area from which flies and other insects 12 are to be attracted. An aperture 88 is provided in the housing through which impacted insects are removed therefrom. A lure 39 for attracting insects is held in a container positioned below the upper surface of the segment 86. A leaf spring 990 has a first extremity 92 rigidly attached near the centre of curvature 93 of the curved wall 18. The spring 90 is substantially straight in its unloaded state, the second spring extremity 94 being close to the inner surface of the curved wall 18.

Spaced-apart first and second electro-magnets 96, 98 are positioned adjacent to the curved wall 18, the first magnet 96 being opposite a first side of the leaf spring 90 for bend-loading said spring towards the first electro-magnet 96. Subsequent sudden release of the second extremity 94, following power cut-off to the first electro-magnet 96, causes the leaf spring 90 to traverse the segment 86 at high velocity and to impact any insects 12 present within said housing segment. The first part of spring travel is powered by the released bending energy in the spring 90. Due to the kinetic energy then contained in the spring 90, it enters the magnetic field of the second electro-magnet 98, which magnet has been powered at the moment of power cut-off to magnet 96. The spring 90 is then attached to magnet 98 in bend-loaded condition.

A control and timing device 100 is electrically connected to the magnets 96, 98 and is arranged for alternately charging and discharging said magnets. A time interval of at least 2 minutes, but preferably as long as 10 minutes, occurs between charge changeover of the electro-magnets 96, 98.

It is to be noted that to prepare this device for operation, or to reset the device after a power cut-off, the user manually bends the leaf spring 90 and brings it into contact with either electro-magnet 96 or 98, whichever is receiving electric power at the time of setting.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A device for destroying insects by mechanical impact, comprising:

a housing including a base member and a curved wall surrounding the base member and attached thereto, and a first segment of said base member being at least partially open and exposed to an area from which flies and other insects are to be attracted, and an aperture provided in said housing through which impacted insects are removed therefrom;

a lure for attracting insects associated with said first segment of said base member; a leaf spring having a first extremity which is attached near the centre of curvature of said curved wall, said spring being substantially straight at its second extremity, the second spring extremity being close to the inner surface of said curved wall; and means for bend-loading said leaf spring and for suddenly releasing said second extremity, thereby causing said leaf spring to traverse said first segment at high velocity and to impact any insects present within said housing segment.

2. A device for destroying insects by mechanical impact, comprising:

a housing including a base member and a curved wall surrounding the base member and attached thereto, and a first segment of said base member being at least partially open and exposed to an area from which flies and other insects are to be attracted, and an aperture provided in said housing through which impacted insects are removed therefrom;

a lure for attracting insects associated with said first segment of said base member;

a leaf spring coiled at a first extremity which is attached to a revolvably driven shaft positioned near the centre of curvature of said curved wall, said spring being substantially straight at its second extremity, said second spring extremity being close to the inner surface of said curved wall;

at least one stop means rigidly attached to the housing near said curved wall, configured to intermittently contact said spring adjacent to said second extremity so that continued drive of said shaft causes bending of said leaf spring and a consequent shortening of the distance between the two spring extremities, further drive of the shaft causing the second extremity to be suddenly released by the stop means, causing the leaf spring to traverse the first segment at high velocity, to impact any insects present within the housing;

further movement of said spring causing the impacted insects to be driven to the aperture of the housing and to pass therethrough, and still further drive of the spring bringing it into renewed contact with the stop means.

3. A device for destroying insects as claimed in claim 2, wherein said curved wall is further provided with a retention lip, configured to improve retention of insects inside said housing during impact.

4. A device for destroying insects as claimed in claim 2, further provided with a reservoir of liquid arranged to receive impacted insects after they pass through said aperture.

5. A device for destroying insects as claimed in claim 2, further provided with a perforated shield protecting said first segment, to prevent entry of a limb of a person or of an animal.

6. A device for destroying insects as claimed in claim 2, further provided with a cover extending over part of the area traversed by said leaf spring.

7. A device for destroying insects as claimed in claim 2, wherein said lure comprises materials emitting an odour attractive to insects.

8. A device for destroying insects as claimed in claim 2, wherein said lure comprises an ultra-violet light bulb.

9. A device for destroying insects as claimed in claim 2, wherein said shaft is driven by a geared electric motor.

10. A device for destroying insects as claimed in claim 9, wherein said motor is powered by an electric storage battery.

11. A device for destroying insects as claimed in claim 9, wherein said motor is powered by a solar cell.

12. A device for destroying insects as claimed in claim 9, wherein said motor is powered by a wind turbine.

13. A device for destroying insects by mechanical impact, comprising:

a housing including a base member and a curved wall surrounding the base member and attached hereto, and a first segment of said base member being at least partially open and exposed to an area from which flies and other insects are to be attracted, and an aperture provided in said housing through which impacted insects are removed therefrom;

a lure for attracting insects associated with said first segment of said base member;

a leaf spring having a first extremity which is rigidly attached near the centre of curvature of said curved wall, said spring being substantially straight in its unloaded state, the second spring extremity being close to the inner surface of said curved wall;

spaced-apart first and second electro-magnets positioned adjacent to said curved wall, said first magnet being opposite a first side of said spring for bend-loading said leaf spring towards said first electro-magnet, subsequent sudden release of said second extremity causing said leaf spring to traverse said first segment at high velocity, to impact any insects present within said housing segment, and by kinetic energy to then enter the magnetic field of said second electro-magnet for attachment thereto in bend-loaded condition; and a control and timing device, electrically connected to said electro-magnets, for alternately charging and discharging said magnets, a time interval of at least 2 minutes occurring between charge changeover of said magnets.

* * * * *